L. D. Lathrop,
Fishing-Line Sinker.

No. 77,628. Patented May 5, 1868.

Witnesses:
E. P. Hale Jr.
S. N. Piper.

Llewellyn D. Lathrop.
by his attorney
R. H. Eddy.

United States Patent Office.

LLEWELLYN D. LOTHROP, OF DOVER, NEW HAMPSHIRE.

Letters Patent No. 77,628, dated May 5, 1868.

IMPROVEMENT IN FISHING-TACKLE.

*The Schedule referred to in these Letters Patent and making part of the same.*

TO ALL PERSONS TO WHOM THESE PRESENTS MAY COME:

Be it known that I, LLEWELLYN D. LOTHROP, of Dover, in the county of Strafford, and State of New Hampshire, (but now residing at East Gloucester, in the county of Essex, and State of Massachusetts,) have invented a new and useful Improvement in Fishing-Line Tackle; and do hereby declare the same to be fully described in the following specification, and represented in the accompanying drawings, of which—

Figure 1:
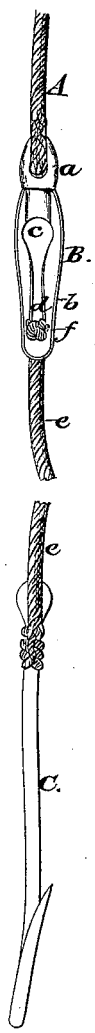
Figure 2:
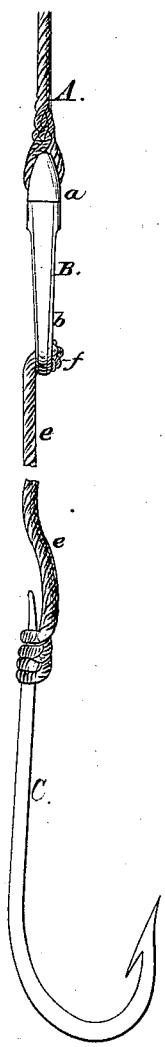

Figure 1 is a front elevation,

Figure 2 a side view, and

Figure 3:

Figure 3 a longitudinal section of the hook-connection swivel constituting my invention.

The drawings also exhibit the fish-line and a hook applied to such swivel.

The object of my invention is to enable a hook to be readily connected with or disconnected from a fishing-line, the same being in order that, after a fish may have been caught and drawn out of the water, he, with the hook sticking into him, may be detached from the line, and a fresh-baited hook be readily connected with the line. Thus, by means of my invention, a fisherman will be able to remove a fish from a hook, or supply bait to such hook, while the fishing-line, with one or more hooks attached to it, may be down in the water, for the purpose of catching fish.

In the drawings, A denotes the main fishing-line, having a swivel, B, suspended from its lower end. The perforated head $a$ of the swivel is so applied to the body part, $b$, as to be capable of being freely revolved relatively thereto. Through such body is made an eye, $c$, having a long slot, $d$, leading from it in manner as represented.

The ganging or connection-line of the hook C is shown at $e$ as provided with a knot, $f$, at its upper end, the diameter of such knot being less than that of the eye $c$, and greater than the width of the slot $d$.

I prefer to make the slot $d$ tapering, that is, somewhat wider at bottom than at top, so that it may hold the ganging-line to good advantage.

In order to connect the said line to the swivel, all that will be necessary will be to pass the knot through the eye of the swivel, and draw the line down into the slot, and to the bottom thereof.

The mode of disconnecting the ganging-line from the swivel will be readily understood from inspection of the two.

I claim the swivel, as made with the eye $c$ and the slot $d$, arranged in it, substantially as and for the purpose hereinbefore specified.

LLEWELLYN D. LOTHROP.

Witnesses:
R. H. EDDY,
F. P. HALE, Jr.